United States Patent
Chung

(10) Patent No.: US 9,326,102 B2
(45) Date of Patent: Apr. 26, 2016

(54) DATA TRANSMISSION SYSTEM, MOBILE ELECTRONIC DEVICE, AND DATA TRANSMISSION METHOD VIA THROW GESTURE

(71) Applicant: Wistron Corporation, New Taipei (TW)

(72) Inventor: Hsiao-Tse Chung, New Taipei (TW)

(73) Assignee: Wistron Corporation, New Taipei (TW)

( * ) Notice: Subject to any disclaimer, the term of this patent is extended or adjusted under 35 U.S.C. 154(b) by 171 days.

(21) Appl. No.: 13/948,184

(22) Filed: Jul. 23, 2013

(65) Prior Publication Data

US 2014/0120956 A1    May 1, 2014

(30) Foreign Application Priority Data

Oct. 25, 2012    (TW) .............................. 101139563 A

(51) Int. Cl.
*H04W 4/02*    (2009.01)

(52) U.S. Cl.
CPC ..................................... *H04W 4/026* (2013.01)

(58) Field of Classification Search
USPC ........ 455/456.6; 707/705; 715/769; 345/158, 345/173
See application file for complete search history.

(56) References Cited

U.S. PATENT DOCUMENTS

| | | | |
|---|---|---|---|
| 2008/0256471 A1 | 10/2008 | Okamoto | |
| 2010/0138743 A1 | 6/2010 | Chou | |
| 2011/0081923 A1* | 4/2011 | Forutanpour | G06F 1/1694 455/457 |
| 2012/0137230 A1* | 5/2012 | Forte | G06F 3/017 725/748 |
| 2012/0244889 A1* | 9/2012 | Nomachi | G01C 21/20 455/457 |
| 2012/0250782 A1 | 10/2012 | Chen et al. | |
| 2015/0128067 A1* | 5/2015 | Wong | G06F 3/0486 715/748 |

FOREIGN PATENT DOCUMENTS

CN    102739705    10/2012

OTHER PUBLICATIONS

"Office Action of Taiwan Counterpart Application", issued on Oct. 15, 2014, with English translation thereof, p. 1-p. 11, in which the listed foreign reference was cited.

\* cited by examiner

*Primary Examiner* — Vladimir Magloire
*Assistant Examiner* — Majid Syed
(74) *Attorney, Agent, or Firm* — Jianq Chyun IP Office

(57) ABSTRACT

A data transmission system, a data transmission method, and a mobile electronic device are provided. The data transmission system includes a first mobile electronic device and a server. The first mobile electronic device includes an orientation recognition module, a positioning unit, and a network communication module. When a user designates at least one shared data and performs a throw-like motion on the first mobile electronic device, the orientation recognition module is adapted for detecting a direction of the throw-like motion to produce direction information corresponding to the direction. The positioning unit obtains position information of the first mobile electronic device. The network communication module transmits the direction information, the position information, and the shared data to the server via a network. After receiving a transmission request from the first mobile electronic device, the server transmits the shared data to at least one second mobile electronic device according to the received.

18 Claims, 6 Drawing Sheets

DATA TRANSMISSION SYSTEM, MOBILE ELECTRONIC DEVICE, AND DATA TRANSMISSION METHOD VIA THROW GESTURE

CROSS-REFERENCE TO RELATED APPLICATION

This application claims the priority benefit of Taiwan application serial no. 101139563, filed on Oct. 25, 2012. The entirety of the above-mentioned patent application is hereby incorporated by reference herein and made a part of this specification.

BACKGROUND OF THE INVENTION

1. Field of the Invention

The present invention generally relates to a data transmission system, in particular, to a data transmission system with a parabolic matching mechanism.

2. Description of Related Art

Due to the popularity of mobile electronic devices and the development of network in the current century, the communication among people becomes easier. Users are able to share different information and files worldwide on the network in various ways. For example, using flash drives or memory cards to exchange information are one of the most common transmission methods. However, the transmission methods through physical connection such as flash drives or memory cards are not advantageous to perform sharing for remote users.

Presently, there exists a Bluetooth wireless transmission method that performs data transmission. A sender is required to perform matching with a receiver first. The data transmission may not be completed before multiple back-and-forth confirmation messages. Furthermore, if a sender is required to transmit data to two or more receivers, the sender needs to perform matching with each of the receivers and transmits the data respectively. In other words, a user of the sender needs to repeat the same steps and waste more waiting time before the next file transmission. When more than one files need to be transmitted, the user may feel troublesome and inconvenience due to tedious steps and time wastes.

Due to the development of network communication and mobile electronic devices in the current century, it is quite necessary to provide a simpler and more convenient data transmission system and method for information exchange.

SUMMARY OF THE INVENTION

The invention is directed to a data transmission system, a data transmission method, and a mobile electronic device, which the tedious conventional steps performed by the user during data transmission may be reduced.

The invention provides a data transmission system including a first mobile electronic device and a server. The first mobile electronic device includes an orientation recognition module, a positioning unit, and a network communication module. When a user designates at least one shared data and performs a throw-like motion on the first mobile electronic device, the orientation recognition module is adapted for detecting a direction of the throw-like motion to produce a direction information corresponding to the direction. The positioning unit is adapted for obtaining position information of the first mobile electronic device. The network communication module is adapted for transmitting the direction information, the position information, and the shared data designated by the user to a server via a network. After the server receives a first transmission request sent by the first mobile electronic device via the network, it transmits the shared data to one or more second mobile electronic devices according to the received direction information and the received position information.

According to an embodiment of the invention, the server includes a database adapted for storing authentication information of each of the mobile electronic devices and storing the direction information, position information, and the shared data transmitted by the first mobile electronic device.

According to an embodiment of the invention, the server determines whether a transmission mode of transmitting the shared data is a public transmission mode or a private transmission mode according to the first transmission request.

According to an embodiment of the invention, if the shared data is transmitted in the public transmission mode, the server sets a public transmission range according to the first transmission request, the direction information, and the position information. The server searches for one or more of the second mobile electronic devices within the public transmission range according to the authentication information in the database and sends a second transmission request to at least one of the second mobile electronic devices.

According to an embodiment of the invention, the server transmits the shared data to the second mobile electronic devices after receiving a confirmation reply message.

According to an embodiment of the invention, if the shared data is transmitted in the private transmission mode, the server sets a private transmission range according to the first transmission request, the direction information, and the position information. The server searches for one or more of the second mobile electronic devices within the private transmission range in a list of matched devices stored in the database so as to generate and transmit a shared list to the first mobile electronic device. Then, the server transmits the shared data to one or more of the second mobile electronic devices selected by the first mobile electronic device.

According to an embodiment of the invention, if the shared data is transmitted in the private transmission mode, the server further searches for a second mobile electronic device closest to the first electronic device according to the first transmission request, the direction information, and the position information. The first and the second mobile electronic devices perform a matching procedure via the server. Matching information of the first and the second mobile electronic devices is stored in a list of matched devices in the server.

According to an embodiment of the invention, the first transmission request includes transmission mode information, setting values of a transmission range, and an upper limit of a receiving number.

The invention also provides a mobile electronic device including an orientation recognition module, a positioning unit, and a network communication module. When a user designates at least one shared data and performs a throw-like motion on the mobile electronic device, the orientation recognition mobile is adapted for detecting a direction of the throw-like motion to produce a direction information corresponding to the direction. The positioning unit obtains position information of the mobile electronic device. The network communication module transmits the direction information, position information, and the shared data to a server via a network so as to transmit the shared data to one or more mobile electronic devices via the server.

The invention further provides a data transmission method adapted for a data transmission system having a plurality of mobile electronic devices and a server. The data transmission method includes the following steps. When a user designates one or more shared data and performs a throw-like motion on a first mobile electronic device, a direction of the throw-like motion is detected to produce a direction information corresponding to the direction. Position information of the first mobile electronic device is obtained. Moreover, a first transmission request is sent to the server by the first mobile electronic device. Furthermore, the direction information, the position information, and the shared data are transmitted to the server via a network by the first mobile electronic device. Lastly, the shared data information is transmitted to at least one second mobile electronic device by the server according to the received direction information and the received position information.

Based on the above descriptions, the data transmission system, the data transmission method, and the mobile electronic device provided in the present invention search for a target device to perform data transmission through detecting a throw-like motion by a user on a mobile electronic device along with position information thereof. File searching and transmission are performed by the server automatically so that tedious conventional steps performed by the user during data transmission may be solved.

In order to make the aforementioned and other objects, features and advantages of this invention comprehensible, a preferred embodiment accompanied with figures is described in detail below.

DESCRIPTION OF THE EMBODIMENTS

Figure 1:
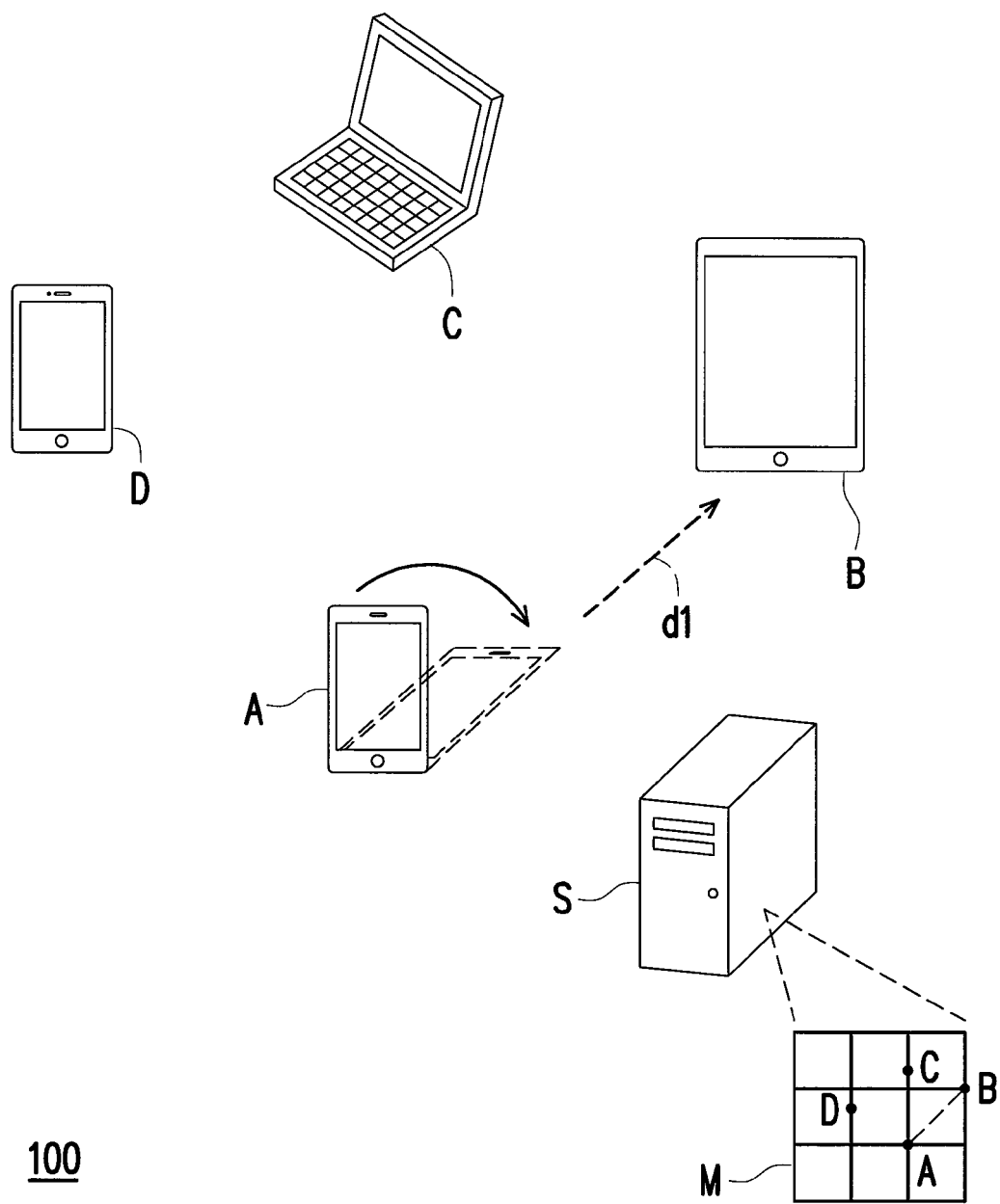
FIG. 1 is a basic concept schematic diagram of a data transmission system according to an embodiment of the present invention.

FIG. 1 is a basic concept schematic diagram of a data transmission system according to an embodiment of the present invention. Referring to FIG. 1, a data transmission system 100 includes a mobile phone A, a tablet computer B, a laptop computer C, a mobile phone D, and a server S, wherein the server S stores map information M which includes position information of each of the devices A, B, C, and D. When a user designates one or more shared data stored in the first mobile phone A and performs a throw-like motion on the first mobile phone A, the first mobile phone A may determine a direction of the throw-like motion (illustrated as an arrow d1). According to the direction of the throw-like motion along with the map information M, the server S knows that the first mobile phone A wants to transmit the designated shared data or files to the tablet computer B. Then, the server may execute data exchange operations such as a file transmission between the mobile phone A and the tablet computer B.

The data transmission system and the data transmission method of the present invention are further developed based on the above concept. In order to make the content of the invention more comprehensible, several embodiments are described below as examples according to which the invention may actually be realized.

Figure 2:
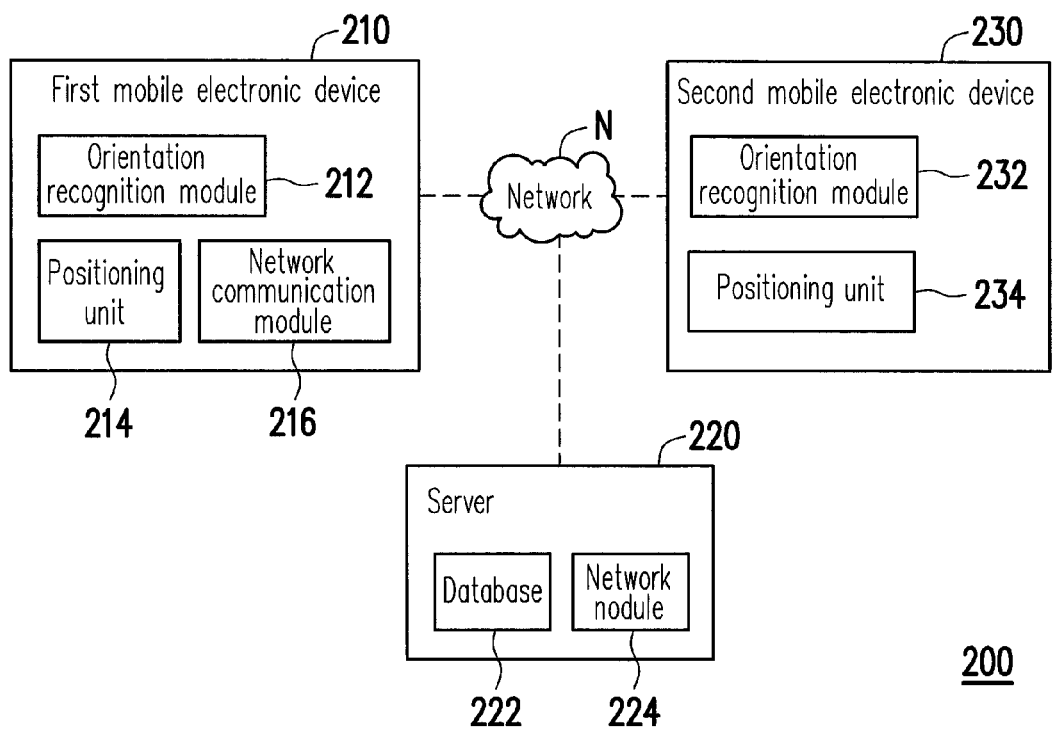
FIG. 2 is a block diagram of a data transmission system according to an embodiment of the present invention.

FIG. 2 is a block diagram of a data transmission system according to an embodiment of the present invention. Referring to FIG. 2, a data transmission system 200 includes a first mobile electronic device 210, a server 220, and one or more second mobile electronic devices 230. (Note that only one second mobile electronic device is illustrated in FIG. 2.) The first and the second mobile electronic devices 210 and 230 are mobile electronic devices with a positioning feature such as, but not limited to, a laptop computer, an Ultrabook computer, a tablet computer, a smart phone, or a watch. The server 220 is, for example, a Cloud server which includes a database 222 and a network module 224. The database 222 is adapted for storing information related to the first and the second mobile electronic devices 210 and 230. The network module 224 may connect to a network N under a wireless local area network (WLAN) standard.

The first mobile electronic device 210 includes an orientation recognition module 212, a positioning unit 214, and a network communication module 216, wherein the functions thereof are described respectively as follows.

The orientation recognition module 212 includes an acceleration sensor (e.g. G-sensor) and an electronic compass (e-compass). When a user performs a parabolic or a throwing operation on the first mobile electronic device 210, the acceleration sensor is adapted for detecting a centripetal force towards the user. A direction of the centripetal force is perpendicular to a direction facing toward the user. The e-compass are further adapted for detecting an orientation so that an absolute direction of the parabolic or throwing operation performed by the user may be obtained and further become direction information.

The positioning unit 214 is, for example, a global positioning system (GPS) or an assisted global position system (AGPS), which is adapted for obtaining the present position information of the first mobile electronic device 210.

The network communication module 216 is, for example, a third generation telecommunication (3G) module, a long term evolution (LTE) communication module, or a wireless fidelity (Wi-Fi) module, which provides a communication channel between the first mobile electronic device 210 and the server 220.

Moreover, the second mobile electronic device 230 may be a mobile electronic device with the same or similar functions as the first mobile electronic device 210 and will not be described herein. It is noted that if the second mobile electronic device 230 is only used as a receiver, it includes at least the positioning unit 232 and the network communication module 234.

Figure 3:
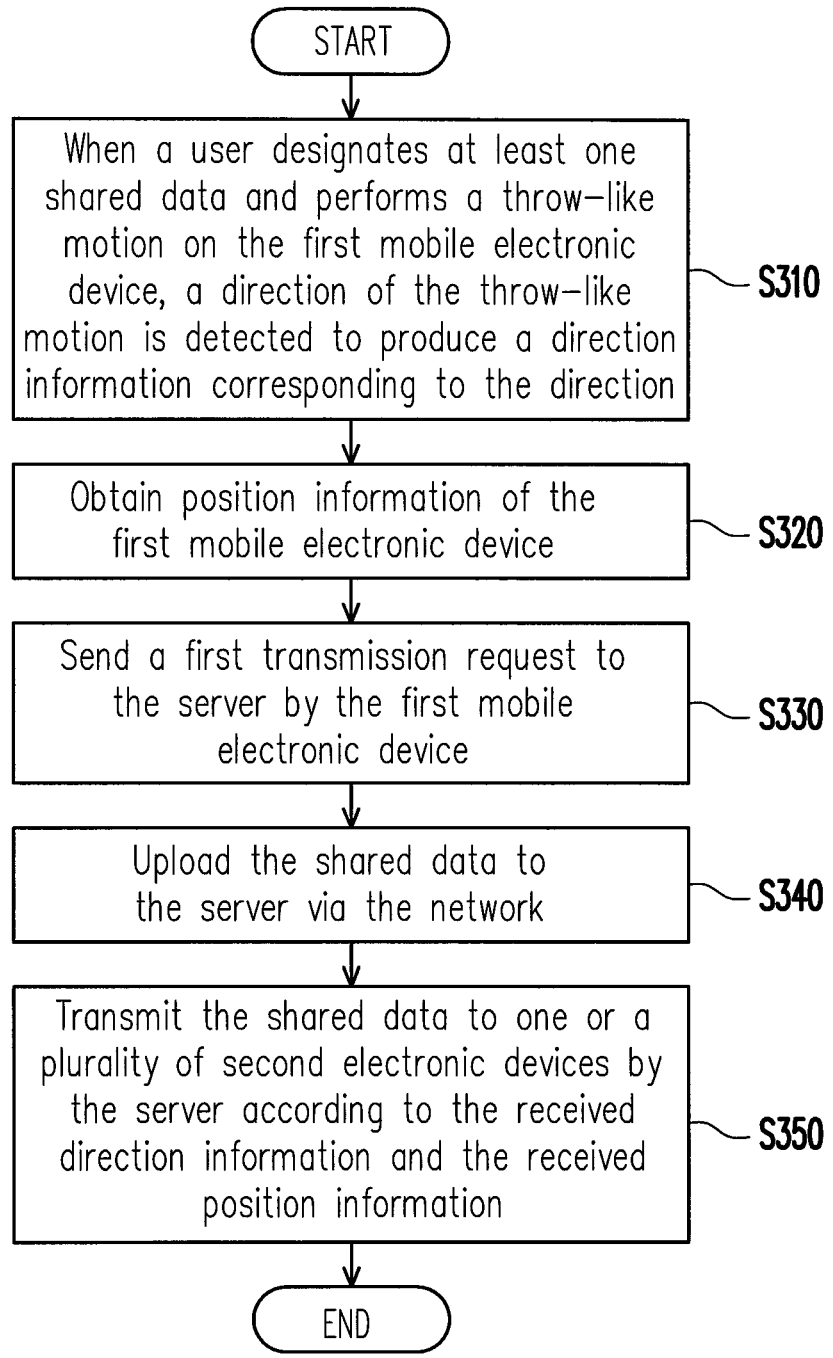
FIG. 3 is a flow diagram of a data transmission method according to an embodiment of the present invention.

FIG. 3 is a flow diagram of a data transmission method according to an embodiment of the present invention. The method of the present embodiment is suitably adapted to the data transmission system 200 in FIG. 2. Detailed steps of the method of the present embodiment will be described along with each component of the data transmission system 200.

First, in step S310, when a user designates one or more shared data and performs a throw-like motion on the first mobile electronic device 210, the orientation recognition module 212 of the first mobile electronic device 210 is adapted for detecting the direction of the throw-like motion to produce a direction information corresponding to the direction. In an embodiment, the shared data to be transmitted to other mobile electronic devices may be designated by, for example, the user of the first mobile electronic device 210. In another embodiment, as soon as the first mobile electronic device 210 detects the throw-like motion, opened pictures, documents, one or more executing files may be automatically set as the shared data. A setting and a selecting method of the shared data are not limited to the description above.

In step S320, the positioning unit 214 of the first mobile electronic device 210 obtains the most recent position information of the first mobile electronic device 210, wherein the position information is, for example, geographic coordinate information.

Then, in step S330, the first mobile electronic device 210 sends a first transmission request to the server 220. The first transmission request includes setting values of a transmission range and an upper limit of a receiving number, which may be obtained by reading configuration settings via the first mobile electronic device 210 or manually set by the user based on an actual condition.

In step S340, the first mobile electronic device 210 transmits the direction information, position information, and the shared data to be transmitted to other mobile electronic devices to the server 220 via the network N. The server 220 stores the received shared data in the database 222.

Lastly, in step S350, the server 220 transmits the shared data based on the received direction information and the received position information to one or more of the second electronic devices 230 which meet the requirements of the first transmission request.

Based on the above, the user is only required to perform a throw-like motion to the direction in which the shared data is to be transmitted. After the designated shared data is uploaded to the server, each step such as file searching or transmission is performed by the server automatically so that tedious conventional steps need to be performed by the user during file transmission are reduced.

Additionally, taking a security and privacy issue of data transmission into consideration, the present invention allows the user to select a data transmission method from a public transmission mode and a private transmission mode. Another embodiment will be described in details hereinafter.

Figure 4:
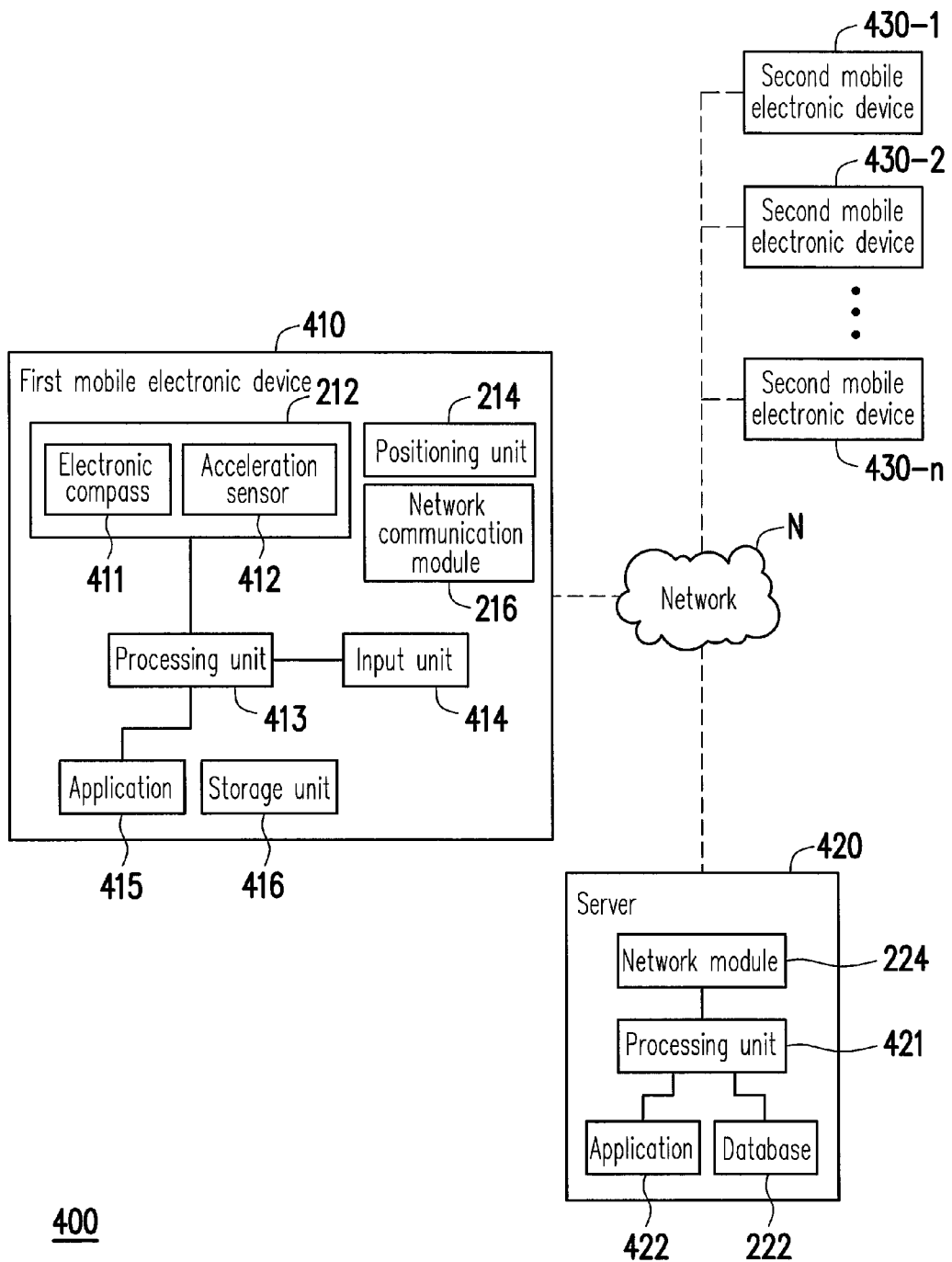
FIG. 4 is a block diagram of a data transmissions system according to another embodiment of the present invention.

FIG. 4 is a block diagram of a data transmissions system according to another embodiment of the present invention. It is noted that the embodiment in FIG. 4 is a detailed embodiment by using the data transmission system 200 in FIG. 2, and therefore only the differences therebetween will be described hereinafter.

The orientation recognition module 212 of a first mobile electronic device 410 includes an e-compass 411 and an acceleration sensor 412, wherein the acceleration sensor 412 may be a Gyrometer or a triaxial accelerator.

A processing unit 413 of the first mobile electronic device 410 may be, but not limited to, software, hardware, or a combination thereof. The software may be, for example, an operation system. The hardware may be, for example, a central processing unit (CPU) or other programmable microprocessors for a normal use or a specific use. The processing unit 413 may be adapted for controlling an operation of each unit or module.

An application 415 of the first mobile electronic device 410 provides a user interface (UI) which allows a user to input each setting value and perform selections such as designating or selecting shared data to be transmitted to other users via an input unit 414, wherein the shared data including, but not limited to, files, music, pictures, videos, applications, is stored in a storing unit 416.

In the present embodiment, second mobile electronic devices 430-1, 430-2, . . . , and 430-n may be mobile electronic devices with the same or similar features as the first mobile electronic device 410, wherein n is a positive integer.

Besides the database 222 and the network module 224, the server 420 further includes a processing unit 421 and an application 422. The processing unit 421 may be, but not limited to, software, hardware, or a combination thereof. The application 422 provides an UI which allows a management person to manage and maintain the server 420.

Figure 5:
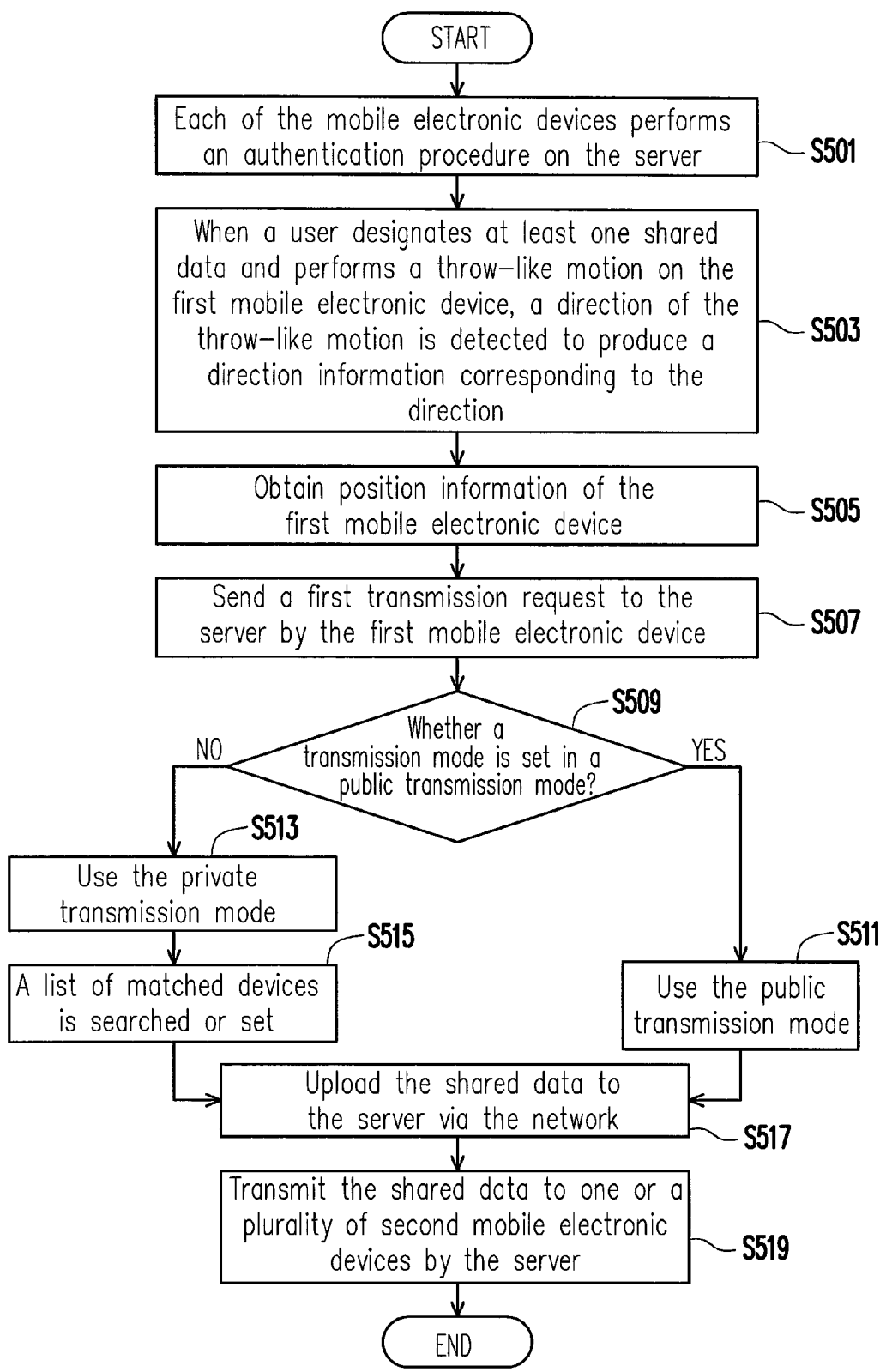
FIG. 5 is a flow diagram of a data transmission method according to another embodiment of the present invention.

FIG. 5 is a flow diagram of a data transmission method according to another embodiment of the present invention. An operating method of a data transmission system 400 will be described in FIG. 5 hereinafter. Please refer to both FIG. 4 and FIG. 5.

First, in step S501, all the first mobile electronic device 410 and the second mobile electronic devices 430-1, 430-2, . . . , and 430-n (n is a positive integer) need to perform an authentication procedure to the server 420 so that the server 420 obtains device information of each mobile electronic device, wherein the device information is, for example, an identification code.

In step S503, the user designates one or more shared data and performs a throw-like motion on the first mobile electronic device 410. The orientation recognition module 212 of the first mobile electronic device 410 is adapted for detecting a direction of the throw-like motion to produce a direction information corresponding to the direction.

In step S505, the positioning unit 214 of the first mobile electronic device 410 obtains the most recent position information of the first mobile electronic device 410, wherein the position information is, for example, geographic coordinate information.

In step S507, the first mobile electronic device 410 sends a first transmission request to the server 420. In the present embodiment, the first transmission request includes transmission mode information, setting values of the transmission range, and an upper limit of a receiving number. The first transmission request may be obtained by reading configuration settings via the first mobile electronic device 410 or manually set by the user based on an actual condition.

Then, in step S509, the server 420 may determine whether the transmission mode is a public transmission mode based on the transmission mode information from the first transmission request. If yes, step S511 is executed next, the shared data is transmitted in the public transmission mode. If not, step S513 is executed next, the shared data is transmitted in a private transmission mode and then a list of matched devices is searched or set in step S515. After the above settings are completed, step S517 is executed, in which the first mobile electronic device 410 uploads the shared data to the server 420, and the server 420 further transmits the shared data to the second mobile electronic devices which meet the restrictions (step S519).

Steps of the public transmission mode and the private transmission mode will be described in details hereinafter.

In the public transmission mode, the server 420 calculates a public transmission range based on the setting values of the transmission range of the first transmission request along within the direction information and the position information of the first mobile electronic device 410. The public transmission range may be, for example, within a range of 20 m extended from a straight line distance between the position of the first mobile electronic device 410 and the direction of the throw-like motion. To prevent an excessive number of the second mobile electronic devices which meet the public transmission range requirement, the upper limit of the receiving number of the first transmission request is adapted for restricting the receiving number so as to prevent the server 420 from over-loading.

After the public transmission range is determined, based on authentication information in the database, the server 420 may send a second transmission request to the second mobile electronic devices which meet the public transmission range requirement and turn on a reception in the public transmission setting.

Figure 6:
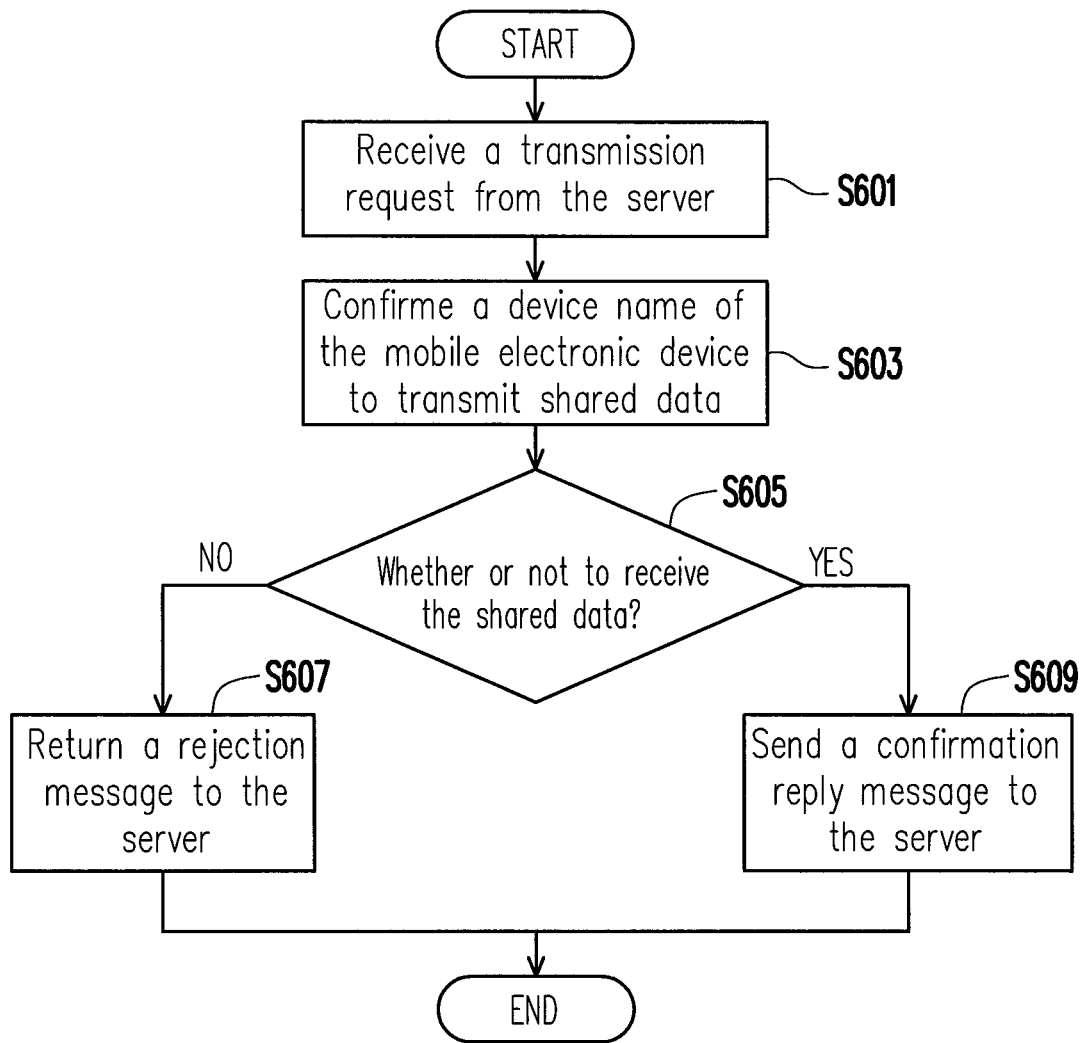
FIG. 6 is a flow diagram of a data reception method of second mobile electronic devices according to another embodiment of the present invention.

FIG. 6 is a flow diagram of a data reception method of second mobile electronic devices according to another embodiment of the present invention. Referring to both FIG. 4 and FIG. 6, the second mobile electronic devices first receive a transmission request from the server 420 (step S601). Then, a device name of the first mobile electronic device 410 to transmit shared data is confirmed (step S603) and whether to receive the shared data is determined (step S605). If not, a rejection message is returned to the server 420 (step S607). If yes, a confirmation reply message is sent to the server 420 (step S609). After the server 420 receives the confirmation reply message from the second mobile electronic devices, step S519 is then processed, that is, the shared data is transmitted to the second mobile electronic devices.

In the private transmission mode, the server 420 first checks whether a matched list of the first mobile electronic device 410 exists in the database 222. If yes, the server 420 calculates a private transmission range based on settings values of the transmission range of the first transmission request along within the direction information and the position information of the first mobile electronic device 410. The private transmission range may be, for example, within a range of 20 m extended from a straight line distance between the position of the first mobile electronic device 410 and the direction of the throw-like motion.

Then, the server 420 updates the position information of each mobile electronic device within the list of the matched device, searches for the second mobile electronic devices within the private transmission range, organizes the device names of the second mobile electronic devices meeting the requirements of the private transmission range into a shared list, and then transmits the shared list to the first mobile electronic device 410. A user of the first mobile electronic device 410 selects receivers which the shared data is transmitted to. Then, the server 420 sends the second transmission request to the second mobile electronic devices selected by the first mobile electronic device.

On the other hand, if the matched list of the first mobile electronic device 410 does not exist in the database 222 of the server 420, or if each of the mobile devices in the matched list is not within the private transmission range, the first mobile electronic device 410 may perform a matching procedure via the server 420. The server 420 searches for a second mobile electronic device which is the closest to the first mobile electronic device 410 to be matched with and transmitted to based on the first transmission request, the direction information, and the position information. The first and the second mobile electronic devices transmit device information such as identification codes via the server 420 for performing matching and store the information of the successfully matched devices in the list of the matched devices in the server.

To sum up, through detecting a throw-like motion by a user on a mobile electronic device along with position information thereof, a target device to perform data transmission is then searched in the present invention. The user is only required to simply perform the throw-like motion. After designated shared data is uploaded to a server, each step such as file searching or transmission may be performed by the server automatically so that tedious conventional steps performed by the user during data transmission may be reduced. Moreover, a selection of transmission modes is provided to enhance security of data transmission and protect privacy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmission system, comprising:
   a first mobile electronic device, comprising:
      an orientation recognition module, wherein when a user designates at least one shared data and performs a throw-like motion on the first mobile electronic device, the orientation recognition module detects a direction of the throw-like motion to produce a direction information corresponding to the direction;
      a positioning unit, obtaining position information of the first mobile electronic device; and
      a network communication module, transmitting the direction information, the position information, and the shared data to a server via a network; and
   the server, wherein after receiving a first transmission request of the first mobile electronic device via the network, the server sets a transmission range according to the received first transmission request, the received direction information, and the received position information and transmits the shared data to at least one second mobile electronic device within the transmission range, wherein the first transmission request comprises setting values of the transmission range, a maximum number of devices to receive the shared data, and a transmission mode,
      wherein the server comprises a database, wherein the database stores authentication information of the first mobile electronic device and the second mobile electronic devices and stores the direction information, position information, and the shared data transmitted by the first mobile electronic device,
      wherein the transmission mode of the first transmission request for transmitting the shared data is one of a public transmission mode and a private transmission mode:
         wherein, in the public transmission mode, the server sets a public transmission range according to the first transmission request, the direction information, the position information, and the authentication information in the database, searches for each of the second mobile electronic devices within the public transmission range, sends a second transmission request to the each of the second mobile electronic devices within the public transmission range, and transmits the shared data to each of the second mobile electronic devices replying a confirmation reply message; and
         wherein, in the private transmission mode, the server sets a private transmission range according to the first transmission request, the direction information, the position information, and a list of matched devices stored in the database, searches for each of the second mobile electronic devices within the private transmission range so as to generate and transmit a shared list to the first mobile electronic device, and transmits the shared data to each of the second mobile electronic devices selected from the shared list by the first mobile electronic device.

2. The data transmission system as claimed in claim 1, wherein
the server determines whether the transmission mode of transmitting the shared data is the public transmission mode or the private transmission mode according to the first transmission request.

3. A mobile electronic device, comprising:
an orientation recognition module, wherein when a user designates at least one shared data and performs a throw-like motion on the mobile electronic device, the orientation recognition mobile detects a direction of the throw-like motion to produce a direction information corresponding to the direction;
a positioning unit, obtaining position information of the mobile electronic device; and
a network communication module, transmitting a first transmission request, the direction information, position information, and the shared data to a server via a network so as to transmit the shared data the shared data to at least one second mobile electronic device within a transmission range via the server, wherein the server stores authentication information of the first mobile electronic device and the second mobile electronic devices and stores the direction information, position information, and the shared data transmitted by the first mobile electronic device, wherein the transmission range is set according to the first transmission request, the direction information, and the position information, wherein the first transmission request comprises setting values of the transmission range, a maximum number of devices to receive the shared data, and a transmission mode, and wherein the transmission mode of the first transmission request for transmitting the shared data is one of a public transmission mode and a private transmission mode:
wherein, in the public transmission mode, the server sets a public transmission range according to the first transmission request, the direction information, the position information, and the authentication information in the database, searches for each of the second mobile electronic devices within the public transmission range, sends a second transmission request to the each of the second mobile electronic devices within the public transmission range, and transmits the shared data to each of the second mobile electronic devices replying a confirmation reply message; and
wherein, in the private transmission mode, the server sets a private transmission range according to the first transmission request, the direction information, the position information, and a list of matched devices stored in the database, searches for each of the second mobile electronic devices within the private transmission range so as to generate and transmit a shared list to the first mobile electronic device, and transmits the shared data to each of the second mobile electronic devices selected from the shared list by the first mobile electronic device.

4. The mobile electronic device as claimed in claim 3, wherein the orientation recognition module comprises an acceleration sensor and an electronic compass.

5. The mobile electronic device as claimed in claim 3, wherein the positioning unit comprises a global positioning system and an assisted global position system.

6. A data transmission method, adapted for a data transmission system having a plurality of mobile electronic devices and a server, wherein the data transmission method comprises:
when a user designates at least one shared data and performs a throw-like motion on a first mobile electronic device, detecting a direction of the throw-like motion to produce a direction information corresponding to the direction;
obtaining position information of the first mobile electronic device;
sending a first transmission request to the server by the first mobile electronic device;
transmitting the direction information, the position information, and the shared data to the server via a network by the first mobile electronic device; and
setting a transmission range according to the received direction information, the received position information and the received shared data and transmitting the shared data to at least one second mobile electronic device by the server,
wherein the first transmission request comprises setting values of the transmission range, a maximum number of devices to receive the shared data, and a transmission mode,
wherein an authentication procedure is performed on the server by the first mobile electronic device and the second mobile electronic devices so as to allow the server to obtain and store authentication information of the first mobile electronic device and the second mobile electronic devices,
wherein the transmission mode of the first transmission request for transmitting the shared data is one of a public transmission mode and a private transmission mode:
wherein when the shared data is transmitted in the pubic transmission mode, the server sets a public transmission range according to the first transmission request, the direction information, the position information, and the authentication information in the database, searches for each of the second mobile electronic devices within the public transmission range, and sends a second transmission request to the each of the second mobile electronic devices within the public transmission range, and transmits the shared data to each of the second mobile electronic devices replying a confirmation reply message; and
wherein when the shared data is transmitted in the private transmission mode, the server sets a private transmission range according to the first transmission request, the direction information, the position information, and a list of matched devices stored in the database, searches for each of the second mobile electronic devices within the private transmission range so as to generate and transmit a shared list to the first mobile electronic device, and transmits the shared data to each of the second mobile electronic devices selected from the shared list by the first mobile electronic device.

7. The data transmission method as claimed in claim 6, wherein after the first transmission request is sent to the server, the data transmission method further comprises:
determining whether the transmission mode for transmitting the shared data is a public transmission mode or a private transmission mode.

8. The mobile electronic device as claimed in claim 3, wherein the server determines whether the transmission mode of transmitting the shared data is the public transmission mode or the private transmission mode according to the first transmission request.

9. A data transmission system, comprising:
a first mobile electronic device, comprising:
an orientation recognition module, wherein when a user designates at least one shared data and performs a throw-like motion on the first mobile electronic device, the orientation recognition module detects a direction of the throw-like motion to produce a direction information corresponding to the direction;
a positioning unit, obtaining position information of the first mobile electronic device; and
a network communication module, transmitting the direction information, the position information, and the shared data to a server via a network; and
the server, wherein after receiving a first transmission request of the first mobile electronic device via the network, the server sets a transmission range according to the received first transmission request, the received direction information, and the received position information and transmits the shared data to at least one second mobile electronic device within the transmission range, wherein the first transmission request comprises setting values of the transmission range, a maximum number of devices to receive the shared data, and a transmission mode,
wherein the server comprises a database, wherein the database stores authentication information of the first mobile electronic device and the second mobile electronic devices and stores the direction information, position information, and the shared data transmitted by the first mobile electronic device,
wherein the transmission mode of the first transmission request for transmitting the shared data is one of a public transmission mode and a private transmission mode:
wherein, in the public transmission mode, the server sets a public transmission range according to the first transmission request, the direction information, the position information, and the authentication info information in the database, searches for each of the second mobile electronic devices within the public transmission range, sends a second transmission request to the each of the second mobile electronic devices within the public transmission range, and transmits the shared data to each of the second mobile electronic devices replying a confirmation reply message; and
wherein, in the private transmission mode, the server searches for the second mobile electronic device closest to the first electronic device according to the first transmission request, the direction information, and the position information, wherein the first and the second mobile electronic devices perform a matching procedure via the server, and matching information of the first and the second mobile electronic devices is stored in a list of matched devices in the server.

10. The data transmission system as claimed in claim 9, wherein
the server determines whether the transmission mode of transmitting the shared data is the public transmission mode or the private transmission mode according to the first transmission request.

11. A mobile electronic device, comprising:
an orientation recognition module, wherein when a user designates at least one shared data and performs a throw-like motion on the mobile electronic device, the orientation recognition mobile detects a direction of the throw-like motion to produce a direction information corresponding to the direction;
a positioning unit, obtaining position information of the mobile electronic device; and
a network communication module, transmitting a first transmission request, the direction information, position information, and the shared data to a server via a network so as to transmit the shared data the shared data to at least one second mobile electronic device within a transmission range via the server, wherein the server stores authentication information of the first mobile electronic device and the second mobile electronic devices and stores the direction information, position information, and the shared data transmitted by the first mobile electronic device, wherein the transmission range is set according to the first transmission request, the direction information, and the position information, wherein the first transmission request comprises setting values of the transmission range, a maximum number of devices to receive the shared data, and a transmission mode, and wherein the transmission mode of the first transmission request for transmitting the shared data is one of a public transmission mode and a private transmission mode:
wherein, in the public transmission mode, the server sets a public transmission range according to the first transmission request, the direction information, the position information, and the authentication information in the database, searches for each of the second mobile electronic devices within the public transmission range, sends a second transmission request to the each of the second mobile electronic devices within the public transmission range, and transmits the shared data to each of the second mobile electronic devices replying a confirmation reply message; and
wherein, in the private transmission mode, the server searches for the second mobile electronic device closest to the first electronic device according to the first transmission request, the direction information, and the position information, wherein the first and the second mobile electronic devices perform a matching procedure via the server, and matching information of the first and the second mobile electronic devices is stored in a list of matched devices in the server.

12. The mobile electronic device as claimed in claim 11, wherein the server determines whether the transmission mode of transmitting the shared data is the public transmission mode or the private transmission mode according to the first transmission request.

13. The mobile electronic device as claimed in claim 11, wherein the orientation recognition module comprises an acceleration sensor and an electronic compass.

14. The mobile electronic device as claimed in claim 11, wherein the positioning unit comprises a global positioning system and an assisted global position system.

15. A data transmission method, adapted for a data transmission system having a plurality of mobile electronic devices and a server, wherein the data transmission method comprises:
when a user designates at least one shared data and performs a throw-like motion on a first mobile electronic device, detecting a direction of the throw-like motion to produce a direction information corresponding to the direction;
obtaining position information of the first mobile electronic device;
sending a first transmission request to the server by the first mobile electronic device;

transmitting the direction information, the position information, and the shared data to the server via a network by the first mobile electronic device; and setting a transmission range according to the received direction information, the received position information and the received shared data and transmitting the shared data to at least one second mobile electronic device by the server, wherein the first transmission request comprises setting values of the transmission range, a maximum number of devices to receive the shared data, and a transmission mode, wherein an authentication procedure is performed on the server by the first mobile electronic device and the second mobile electronic devices so as to allow the server to obtain and store authentication info ration of the first mobile electronic device and the second mobile electronic devices, wherein the transmission mode of the first transmission request for transmitting the shared data is one of a public transmission mode and a private transmission mode:

wherein when the shared data is transmitted in the pubic transmission mode, the server sets a public transmission range according to the first transmission request, the direction information, the position information, and the authentication information in the database, searches for each of the second mobile electronic devices within the public transmission range, and sends a second transmission request to the each of the second mobile electronic devices within the public transmission range, and transmits the shared data to each of the second mobile electronic devices replying a confirmation reply message; and wherein when the shared data is transmitted in the private transmission mode, the server searches for the second mobile electronic device closest to the first electronic device according to the first transmission request, the direction information, and the position information, wherein the first and the second mobile electronic devices perform a matching procedure via the server, and matching information of the first and the second mobile electronic devices is stored in a list of matched devices in the server.

16. The data transmission method as claimed in claim 15, wherein after the first transmission request is sent to the server, the data transmission method further comprises:

determining whether the transmission mode for transmitting the shared data is a public transmission mode or a private transmission mode.

17. The data transmission system as claimed in claim 1, wherein the server stores map information including relative position information of the first mobile electronic device and the second mobile electronic devices, and wherein the server sets the public transmission range and the private transmission range according to the map information and the received direction information.

18. The data transmission system as claimed in claim 1, wherein when the user does not designate any shared data and performs a throw-like motion on the first mobile electronic device, opened files are set as the shared data.

* * * * *